US005351715A

United States Patent [19]

Byam

[11] Patent Number: 5,351,715

[45] Date of Patent: Oct. 4, 1994

[54] INTEGRALLY PILOTED, PNEUMATICALLY ACTUATED VALVES

[75] Inventor: Matthew D. Byam, Indianapolis, Ind.

[73] Assignee: ABB Flakt, Inc., Auburn Hills, Mich.

[21] Appl. No.: 6,799

[22] Filed: Jan. 21, 1993

Related U.S. Application Data

[63] Continuation-in-part of Ser. No. 840,879, Feb. 25, 1992, abandoned.

[51] Int. Cl.[5] ........................ F16K 11/22; F16K 31/42

[52] U.S. Cl. .................................. 137/607; 251/30.01

[58] Field of Search ............................... 137/606, 607; 251/30.01, 30.04

[56] References Cited

U.S. PATENT DOCUMENTS

| | | | |
|---|---|---|---|
| 3,169,882 | 2/1965 | Juvinall et al. | 117/93.4 |
| 3,169,883 | 2/1965 | Juvinall | 117/93.42 |
| 3,572,366 | 3/1971 | Wiggins | 137/606 X |
| 4,148,932 | 4/1979 | Tada et al. | 427/31 |
| 4,278,046 | 7/1981 | Clarke et al. | 118/695 |
| 4,306,587 | 12/1981 | Tchebinyayeff | 137/606 |
| 4,311,724 | 1/1982 | Scharfenberger | 427/8 |
| 4,348,425 | 9/1982 | Scharfenberger | 427/8 |
| 4,422,576 | 12/1983 | Saito et al. | 239/693 |
| 4,524,906 | 6/1985 | Kenyon et al. | 251/30.01 X |
| 4,592,305 | 6/1986 | Scharfenberger | 118/677 |
| 4,816,083 | 3/1989 | Bangyan | 137/606 X |
| 4,957,060 | 9/1990 | Cann | 118/699 |
| 5,146,950 | 9/1992 | Rodgers et al. | 137/563 |

OTHER PUBLICATIONS

Ernst Greg, "Intrinsic Safety-An Alternative to Explosion-Proof," *Measurements and Control*, Apr. 1987, pp. 148-151.

*Primary Examiner*—Stephen M. Hepperle
*Attorney, Agent, or Firm*—Harness, Dickey & Pierce

[57] ABSTRACT

A coating material color change system includes a manifold having a first passageway through which a selected color flows during its selection, a plurality of coating material passageways intersecting the main passageway, and an equal plurality of coating material supply valves mounted to the manifold. Each coating material supply valve has a body and a member movable in the interior of the valve body for controlling the flow of the coating material to be supplied by that coating material supply valve through a respective coating material passageway to the main passageway, and a mechanism for actuating the member. The mechanism is controllable by a superatmospheric pressure fluid signal selectively to control the position of the member and thus the supply of the coating material to the first passageway. The manifold and valve bodies include second passageways and means for coupling the second passageways to a source of operating fluid under superatmospheric pressure. A valve seat couples each second passageway to the interior of a respective valve body. Intrinsically safe electrically operated valves control the flow of superatmospheric pressure fluid through respective second passageways from the source of superatmospheric pressure fluid to the interiors of the respective valve bodies.

7 Claims, 2 Drawing Sheets

INTEGRALLY PILOTED, PNEUMATICALLY ACTUATED VALVES

Figure 1:
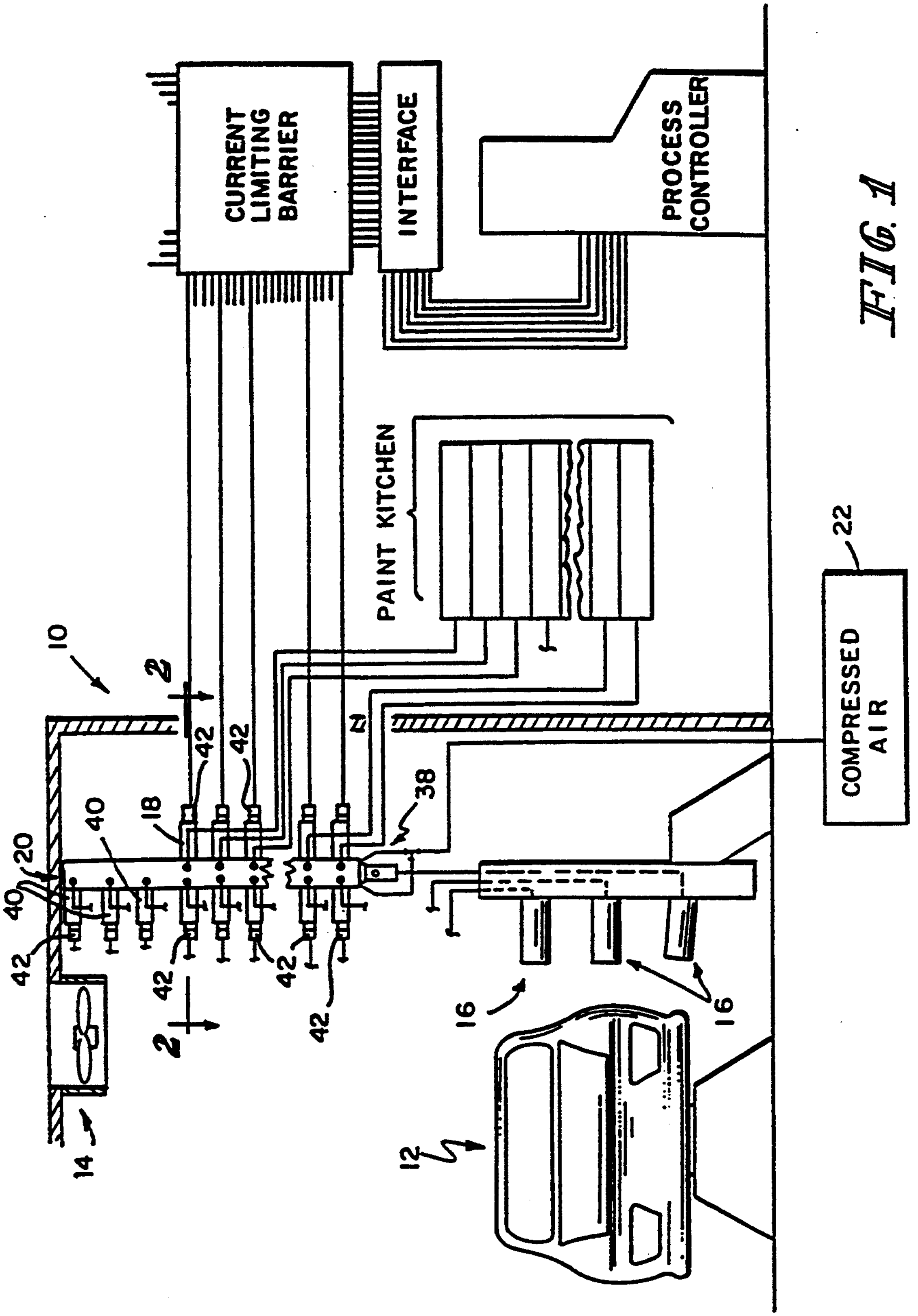

This is a continuation-in-part of my earlier filed and co-pending U.S. Ser. No. 07/840,879 filed Feb. 25, 1992, now abandoned and assigned to the same assignee as this application. The disclosure of U.S. Ser. No. 07/840,879 is hereby incorporated herein by reference.

This invention relates to a manifold for distribution of coatings from various different coating material sources to a coating dispensing device.

The technology of coating materials distribution is well documented. There are, for example, the systems described in the following listed U.S. Pat. Nos.: 4,311,724; 4,348,425; 4,422,576; and 4,592,305.

Intrinsically safe technology in coating material distribution systems is discussed in some detail in U.S. Pat. No. 4,957,060 and references cited there, notably U.S. Pat. No. 4,278,046 and Ernst Greg, "Intrinsic Safety—An Alternative to Explosion-Proof", *Measurements and Control,* Apr., 1987, pp. 148-151.

In systems of the type described in U.S. Pat. No. 5,146,950, and in U.S. Ser. No. 07/840,879, filed Feb. 25, 1992 and assigned to the same assignee as this application, pneumatic signals are coupled to the color valves on the color change manifold from a remote source. Such systems rely on a pneumatic signal for the final feed from the color valve controller to the individual color valves mounted on the color change manifold. The system described in U.S. Ser. No. 07/840,879 makes an effort to reduce to a minimum the pneumatic signal "lag" present in prior art systems. However, even further reduction in pneumatic signal lag is possible.

According to the invention, a coating material type change system changes the type of coating material being supplied to a dispensing device from one type to another. The system includes a manifold having a first passageway through which a selected type of coating material flows during its selection as the type to be supplied to the dispensing device. The manifold further provides a plurality of coating material passageways intersecting the first passageway. An equal plurality of coating material supply valves is mounted to the manifold. Each coating material supply valve has a body and a member movable in the interior of the valve body for controlling the flow of the coating material to be supplied by that coating material supply valve through a respective coating material passageway to the first passageway and a mechanism for actuating the member. The mechanism is controllable by an air signal selectively to control the position of the member and thus the supply of the coating material to the first passageway. The manifold and valve bodies include second passageways and means for coupling the second passageways to a source of air under superatmospheric pressure. A valve seat couples each second passageway to the interior of a respective valve body. An electrically operated valve controls the flow of air through the second passageway from the source of compressed air to the interior of each valve body. Incorporating the second passageways into the manifold and valve bodies themselves minimizes the distance the air signal must pass from the intrinsically safe electrically operated valve to the mechanism.

According to an illustrative embodiment, the electrically operated valves are intrinsically safe electrically operated valves.

According to an illustrative embodiment, the different coating material types are different coating material colors.

Figure 2:
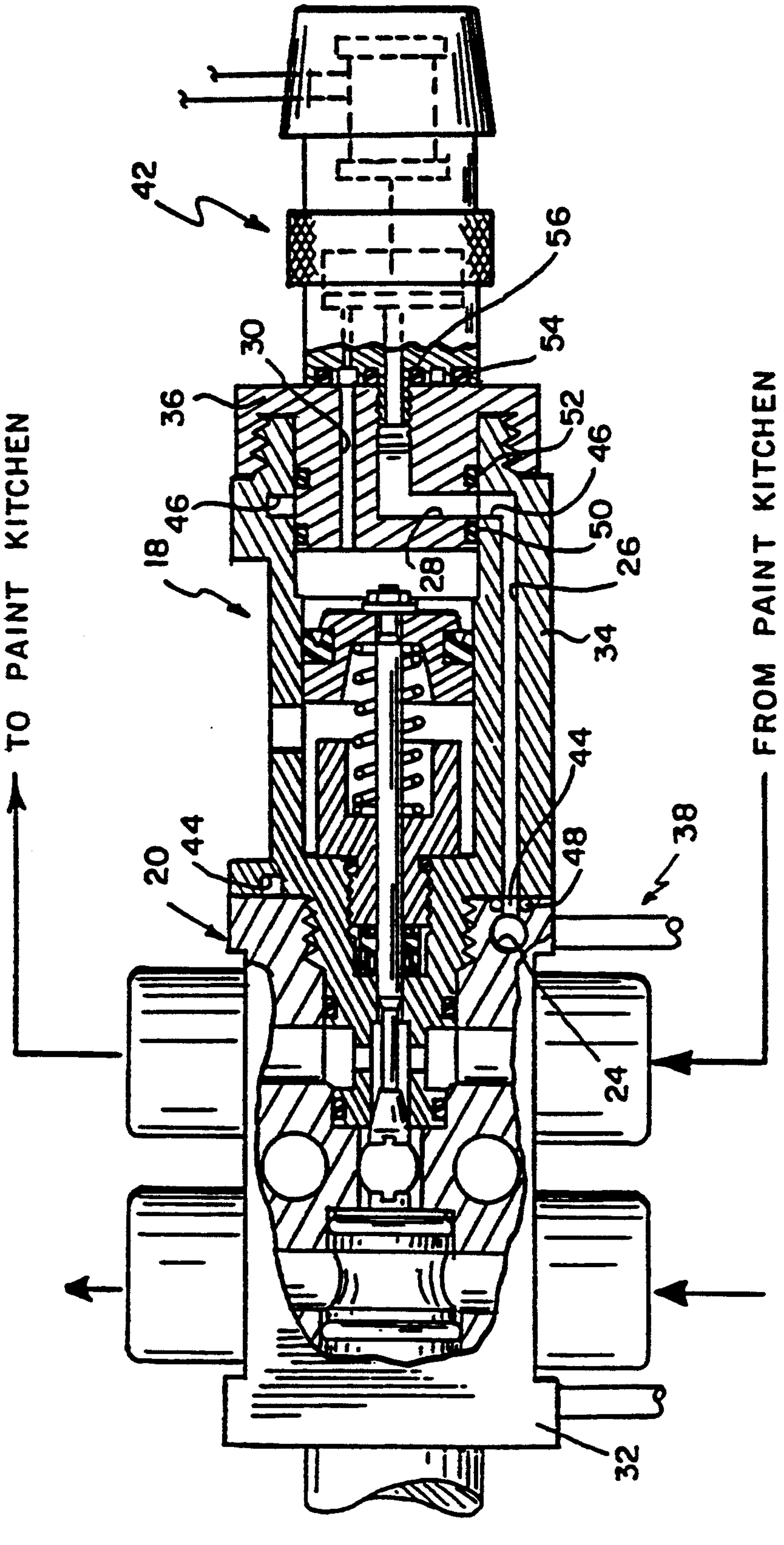

The invention may best be understood by referring to the following description and accompanying drawings which illustrate the invention: In the drawings:

FIG. 1 illustrates fragmentarily and highly diagrammatically an end elevation of a spray booth incorporating a system according to the present invention; and, FIG. 2 illustrates somewhat less diagrammatically a fragmentary sectional view of a detail of the system illustrated in FIG. 1, taken generally along section lines 2—2 thereof.

Turning now to FIG. 1, a spray booth 10 is illustrated for the application of fluent coatings of various types, e.g., colors, to successive automobile bodies 12 as the bodies 12 are conveyed through the booth 10. The coatings are subsequently cured or otherwise fixed on the bodies 12 by other well known means, such as IR ovens, which will not be further discussed in any detail. Booth 10 is ventilated 14 and the atmosphere withdrawn from the booth 10 is customarily rigorously scrubbed or otherwise treated to remove oversprayed coating material and the like.

The fluent coatings are applied by dispensers 16 which may be, for example, guns of the type described in U.S. Pat. Nos. 3,169,882 or 3,169,883, or rotary atomizer of the type described in U.S. Pat. No. 4,148,932.

The fluent coatings illustratively are supplied from a so-called "paint kitchen" containing, for example, several sources of colors to color valves 18 mounted on a color change manifold 20. The color valves 18 and color change manifold 20 illustratively are generally of the type illustrated and described in U.S. Pat. No. 5,146,950. The various colors of coating materials continuously circulate from the paint kitchen through the valves 18 and back to the paint kitchen. When a selected one of the valves 18 is opened by an air signal provided to it, some portion of the circulating coating material is shunted through the open valve 18, into the manifold 20 and then from the manifold 20 to the dispensing device 16, from which it is dispensed onto the automobile body 12.

The air signals to open the various color valves 18 are provided from a common "factory air" compressed air source 22 through air passageways 24, 26, 28, 30 (FIG. 2) provided in the manifold body 32 itself, the various color valves' respective bodies 34 themselves, and the color valves' closure caps 36. The air passageways 24 are coupled by appropriate couplings 38 to compressed air source 22. Caps 36 illustratively are only about 1 cm or so in thickness. This construction reduces to a minimum the lag between the generation of the "open valve" air signal and the arrival of that signal at the color valve 18 to be controlled. The arrival of the coating material at the dispenser 16 is thus capable of much tighter control than with prior art systems of the types illustrated in U.S. Pat. Nos. 4,957,060 and 4,278,046.

Identical valves 40 to color valves 18 are provided for the other services, such as low and high pressure compressed air and solvent, to the color change manifold 20. An intrinsically safe electric valve 42 is provided on each of the air valve caps 36 and controls air flow through its respective air valve cap 36 from the compressed air source 22 to its respective color valve 18 or service valve 40. Electric valves 42 illustratively are 15.5 VDC, 0.65 watt solenoid valves, such as Clippard Instrument Laboratories, Inc., model EI-3M Minimatics TM valves. The valve bodies 34 and closure caps 36 are provided with annular grooves 44 and 46, respectively, so that alignment of the passageways 24, 26 and 26, 28 is not critical to the supply of compressed air to the interiors of valve bodies 34 when their respective electric valves 42 are actuated. Additionally, suitable sealing rings 48, 50, 52, 54, 56 are provided at appropriate locations in the manifold body 32, caps 36 and electric valves 42.

The 15.5 VDC signals which control the various color and service valves 18, 40 are provided through current limiting barriers of conventional construction and operation which minimize the flow into the booth 10 of electrical energy under any foreseeable failure mode of the electrical system which supplies the electric valves 42. These 15.5 VDC signals can be generated and distributed in any suitable manner, such as from a computer which controls the coating operation and sequence of colors, solvents, compressed air, etc. to be dispensed, working through a suitable interface.

Mounting of the electric valves 42 directly to the color and service valves 18, 40 and supply of the factory compressed air 22 to the manifold body 32 and through the wall of each valve body 34 and cap 36 directly to the respective valve 18, 40 reduces the distance across which the pneumatic signals which control the valves 18, 40 must travel to a minimum. That distance, which can best be appreciated by referring to FIG. 2, is basically the thickness of the color valve's closure cap 36. Additionally, it reduces substantially the number of compressed air lines which must be supplied within the coating booth 10.

What is claimed is:

1. A coating material type change system for changing the type of coating material being supplied to a dispensing device from one type to another, the system including a manifold having a main coating material passageway through which a selected type of coating material flows during its selection as the type to be supplied to the dispensing device, a plurality of secondary coating material passageways intersecting the main passageway, an equal plurality of coating material supply valves mounted to the manifold, each coating material supply valve having a body and a member movable in an interior portion of the valve body for controlling the flow of the coating material to be supplied by that coating material supply valve through a respective secondary coating material passageway to the main coating material passageway and a mechanism for actuating the member, the mechanism being controllable by a control fluid selectively to control the position of the member and thus the supply of the coating material to the main coating material passageway, the manifold and valve bodies including control fluid passageways and means for coupling the control fluid passageways to a source of control fluid at superatmospheric pressure, a valve seat for coupling each control fluid passageway to the interior portion of a respective valve body, and an equal plurality of electrically operated valves for controlling the flow of control fluid through the respective control fluid passageways from the source of control fluid to the interior portions of respective valve bodies to minimize the distance the control fluid must travel from a respective electrically operated valve to the interior portion of a respective valve body.

2. The system of claim 1 wherein the electrically operated valves are intrinsically safe electrically operated valves.

3. The system of claim 1 wherein the different coating material types are different coating material colors.

4. The system of claim 2 wherein the different coating material types are different coating material colors.

5. A coating material type change system for changing the type of coating material being supplied to a dispensing device from one type to another, the system including a manifold having a main coating material passageway through which a selected type of coating material flows during its selection as the type to be supplied to the dispensing device, a plurality of secondary coating material passageways intersecting the main passageway, an equal plurality of coating material supply valves mounted to the manifold, each coating material supply valve having a body and a member movable in an interior portion of the valve body for controlling the flow of the coating material to be supplied by that coating material supply valve through a respective secondary coating material passageway to the main coating material passageway and a mechanism for actuating the member, the mechanism being controlled by a control fluid selectively to control the position of the member and thus the supply of the coating material to the main coating material passageway, the manifold including a first control fluid passageway coupled to a source of control fluid at superatmospheric pressure, each supply valve body including a second control fluid passageway in fluid communication with the first fluid passageway, each coating material supply valve further including closure cap having a third control fluid passageway in fluid communication with the second control fluid passageway in the supply valve body and a fourth control fluid passageway in fluid communication with said interior portion of the supply valve body, each coating material supply valve having an electrically operated pilot valve directly coupled to the supply valve closure cap, each pilot valve including a valve seat for controllably coupled each third control fluid passageway to each fourth control fluid passageway to enable control fluid to enter the interior portion of a respective supply valve body to minimize the distance the control fluid must travel from a respective electrically operated pilot valve to the interior portion of a respectively valve body.

6. The system of claim 5, wherein the first control fluid passageway communicates with each second control fluid passageway via an annular groove formed in each coating material supply valve body.

7. The system of claim 6, wherein each second control fluid passageway communicates with its corresponding third control fluid passageway via an annular groove formed in one of the coating material supply valve body and its corresponding closure cap.

* * * * *